United States Patent [19]

Sakurai

[11] 4,106,807
[45] Aug. 15, 1978

[54] MOTOR VEHICLE BODY CONSTRUCTION

[75] Inventor: Shinichiro Sakurai, Tokyo, Japan

[73] Assignee: Nissan Motor Company, Limited, Japan

[21] Appl. No.: 787,967

[22] Filed: Apr. 15, 1977

[30] Foreign Application Priority Data

Apr. 23, 1976 [JP] Japan .................. 51-47074

[51] Int. Cl.² ............................................. B60G 9/00
[52] U.S. Cl. .................................. 296/28 R; 180/71; 280/781; 267/18
[58] Field of Search ....................... 296/28 R; 180/71; 280/106.5; 267/18, 31, 36

[56] References Cited

U.S. PATENT DOCUMENTS

| 2,669,315 | 2/1954 | Butterfield | 180/71 |
| 3,664,452 | 5/1972 | Schaeff | 180/71 |

*Primary Examiner*—Philip Goodman
*Attorney, Agent, or Firm*—Robert E. Burns; Emmanuel J. Lobato; Bruce L. Adams

[57] ABSTRACT

A chassis is formed with four mounting sites which enable an independent suspension to be mounted via the first, second and third sites and a rigid axle suspension to be mounted via the first, second and fourth sites, a variety of bolt on brackets adapting the suspensions to the sites.

7 Claims, 19 Drawing Figures

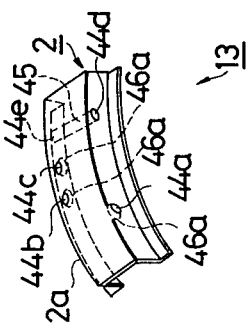
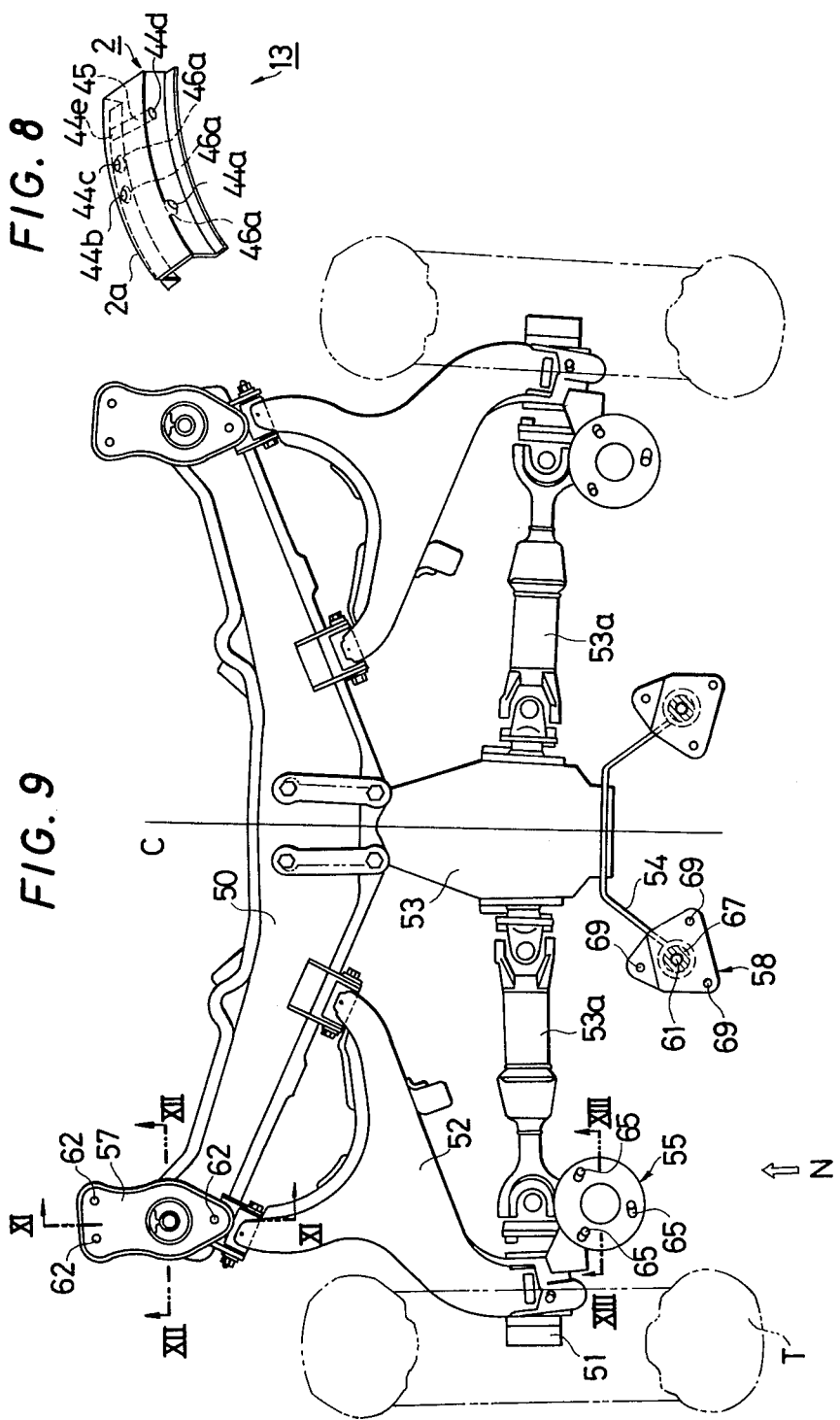

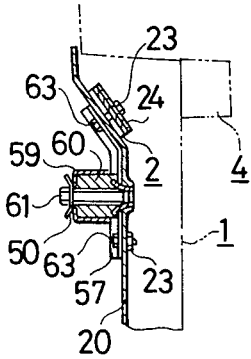
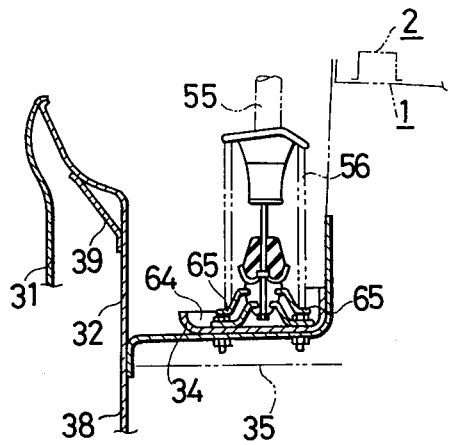
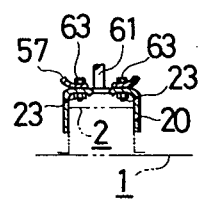
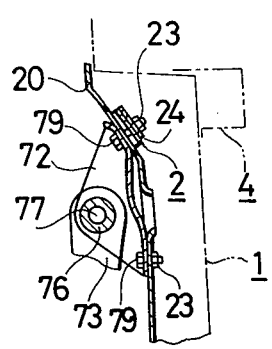
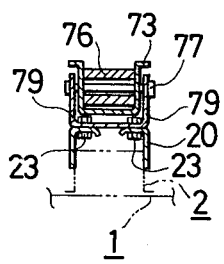
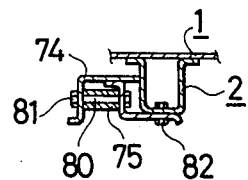
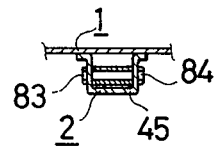

MOTOR VEHICLE BODY CONSTRUCTION

This invention relates to a motor vehicle body construction and more particularly to a construction which permits various types of rear suspension to be fitted to the same basic body component or components whereby the same basic component or components can be used in various types of vehicle.

As is well known there are various types of vehicle bodies such as coupe, sedan, station wagon, utility or pick up, van, etc. Each of these body types has from the point of an optical combination of performance (road holding and comfort) and cost, different suspension requirements. Coupes, which are usually expensive high performance type vehicles invariably require a sophisticated independent suspension to provide the necessary road holding characteristics tempered with a good dgree of ride comfort. A sedan, on the other hand is not intended to be driven in the same manner as the coupe, and is usually fitted with a "live" rigid axle or non independent suspension at the rear which provides the desired degree of ride comfort but at a substantially lower cost. Vans and the like are usually fitted with a "live" rigid axle or non independent suspension at the rear for reasons of cost and sturdiness; being required to carry from time to time much greater loads than the sedan or coupe.

However in many cases the above-mentioned vehicles have approximately the same length and width and almost the same chassis construction, the latter component being modified in each case to receive each different suspension. This modification invariably involves the production of a different chassis member for each vehicle type, requiring within a plant producing the above listed different types of vehicle, a vast number of different major components to be stocked.

Stocking of many different types of components is, as is well known, extremely expensive resulting in an overall high production cost which is passed on to the consumer purchasing the vehicle (whichever type it may be). Hence one excellent way of reducing the cost of vehicle production is to eliminate the necessity to stock so many components. The present invention proposes a simple solution to this stocking problem, which is to use the same basic chassis so designed that by using simple (pre-assembled) mounting components or brackets a number of different types of suspensions can be operatively fitted thereto. Although the actual number of components may not be in fact reduced, the bulk, production and storage cost of the mounting brackets would be (and in fact is) much less than stocking of the numerous bulky chassis units.

It is therefore an object of this invention to provide a vehicle body construction which has a chassis or the equivalent arranged and so constructed that a plurality of different types of vehicle suspensions may be fitted thereto via the use of simple and inexpensive mounting components.

It is also an object of this invention to provide a vehicle body construction which is relatively simple and easy to assemble which can have a plurality of different suspensions fitted thereto via the use of simple and inexpensive mounting units.

Other features objects and advantages of the invention will become more clearly understood as the description proceeds taken in conjunction with the accompanying drawings in which:

FIG. 8 is a perspective view of part of one of the chassis constituting members showing a fourth of four preferred mounting locations according to this invention;

FIG. 9 is a plan view of a semi trailing arm independent rear suspension;

Figure 14:
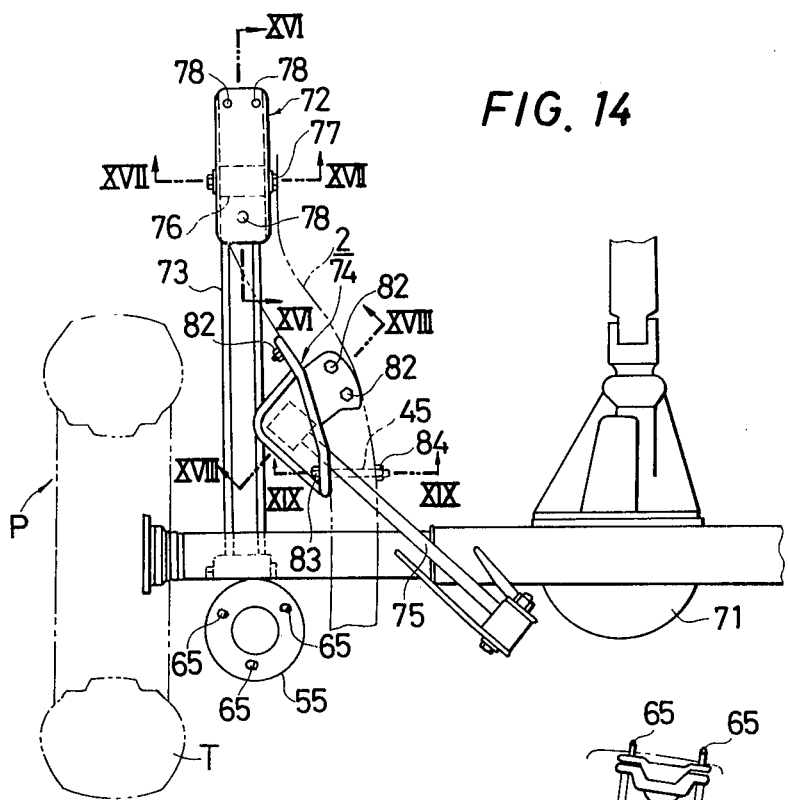
Figure 15:
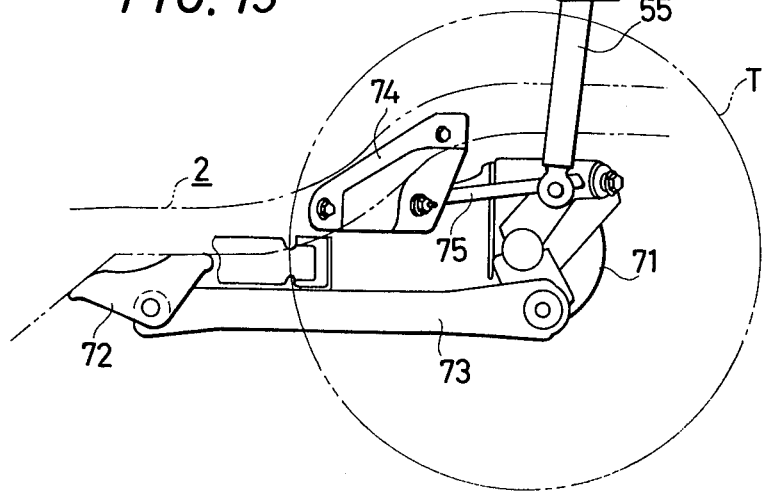

FIGS. 11, 12, and 13 are sectional views of mounting locations taken along the section lines XI—XI, XII—XII and XIII—XIII of FIG. 9 respectively;

FIG. 14 is a plan view of a four link trailing arm rigid axle suspension;

FIG. 15 is an elevational view of the suspension of FIG. 14 as seen from P in FIG. 14; and FIGS. 16 to 19 are sectional views taken along the section lines XVI—XVI, XVII—XVII, XVIII—XVIII and XIX—XIX of FIG. 14 respectively.

Figure 1:
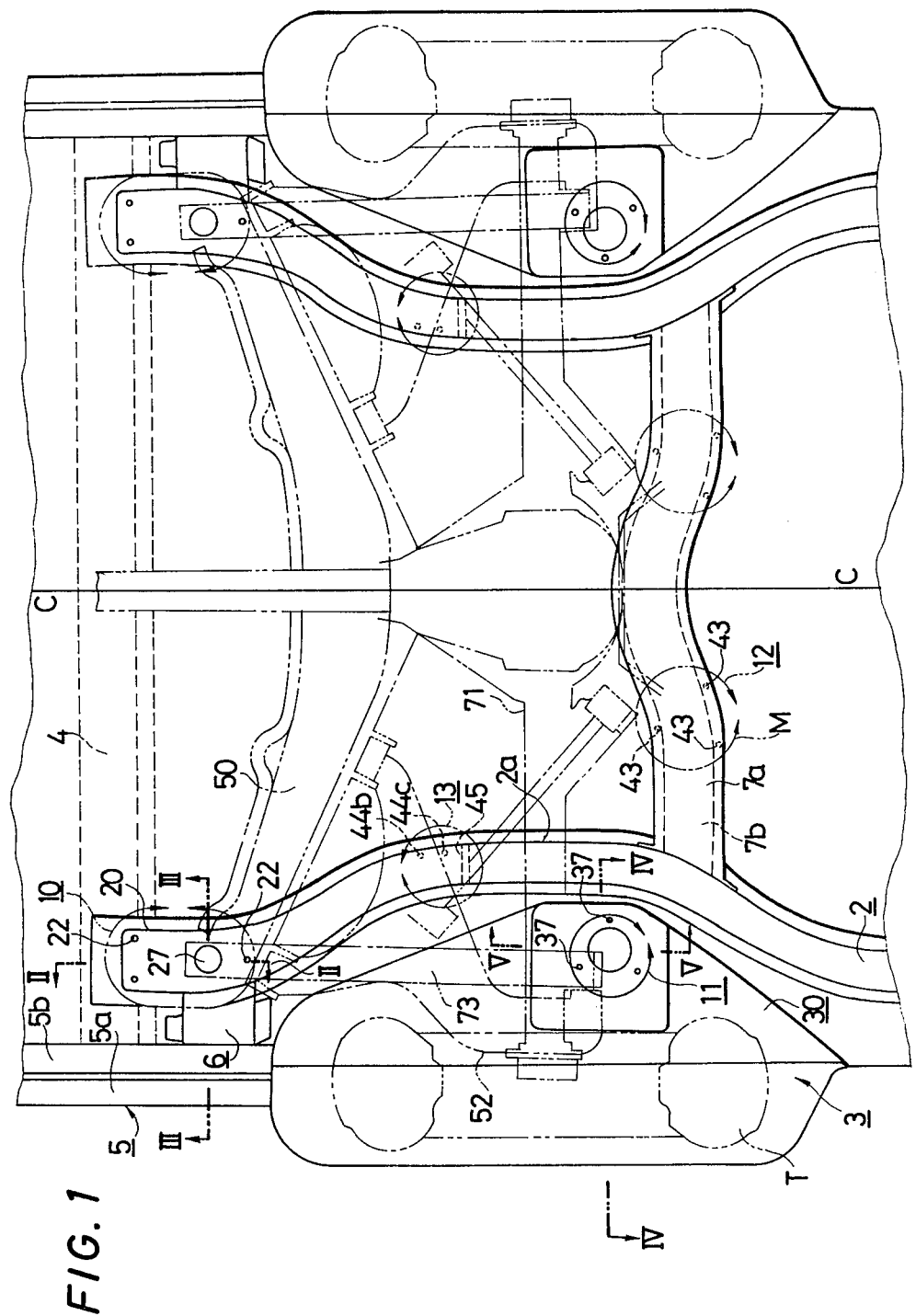
FIG. 1 is a plan view of a portion of the bottom of the rear of a motor vehicle, as viewed from below the vehicle, showing constructional features of the chassis according to this invention and showing in phantom outline both a semi trailing arm independent rear suspension and a four link trailing arm rigid axle suspension.
Figure 2:
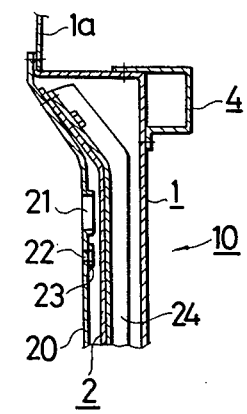
FIG. 2 is a sectional view taken along the section line II—II of FIG. 1.
Figure 3:
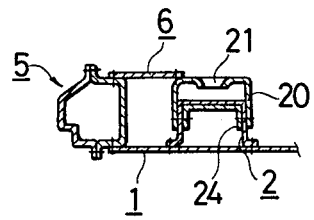
FIG. 3 is a sectional view taken along the section line III—III of FIG. 1.

Let us now turn to FIGS. 1, 2 and 3. FIG. 1 shows a view of the bottom of a vehicle having a chassis or the equivalent wherein the numeral 1 denotes a rear floor panel which forms the floor of the passenger compartment and extends substantially to the rear end of the vehicle. An elongate rigid member 2 having a channel type cross section extends longitudinally along the both sides of the vehicle (only one is shown) and as best seen in FIGS. 1, 14 and 15 the elongate rigid member 2 has a curved section which is denoted in FIG. 1 by 2a.

Formed adjacent the curved portion of member 2 is the rear wheel housing 3. Extending laterally across the vehicle forward of the wheel housing 3 is a cross member 4 which also has a channel cross section. As shown in FIG. 2 the cross member 4 is connected to the floor panel 1. Formed along the lower edge of the vehicle parallel to the centre line of the vehicle C is a side seal 5 comprised of an inner panel 5a and an outer panel 5b. Bridging between the side seal 5 and a member 20 is an outrigger member 6 (the arrangement of which is best seen in FIG. 3).

Joining the two elongate rigid members 2 is a differential supporting member 7 comprised of a cover 7a and a main member 7b which also has a channel cross section. This member joins the two members 2 at locations rear of the axle or half axles joining the differential and the rear wheels.

Now, denoted by 10, 11, 12 and 13 are locations (encircled) which form one of each of the first, second, third and fourth pairs of support or mounting sites respectively for the various suspensions for simplicity of explanation only one of each pair of mounting sites will be referred to and described hereinafter, although it is to be understood that there are symmetrically arranged pairs of each site.

The member 20 as seen in FIGS. 2 and 3 also has a channel cross section and is disposed so as to cover the elongate rigid members 2 to thus be contigual therewith. This member can be if deemed advantageous formed integrally with the elongate rigid member 2.

Formed in the member 20 are a plurality of holes 22 and one large hole 21. Welded to the inner surface of the member 20 are a plurality of units. Each nut is aligned with the aforementioned holes 22. The purpose of these nuts is to permit the insertion and retention of securing bolts. These holes according to this invention define the first site where various suspensions may be mounted, however a more detailed description will be given later in this disclosure.

Figure 4:
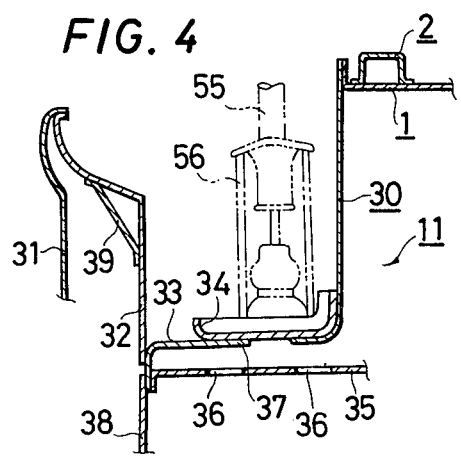
FIG. 4 is a sectional view taken along the section line IV—IV of FIG. 1 showing the mounting position of a shock absorber of either the semi trailing arm independent rear suspension (or S/R.IRS) or a four link trailing arm rigid axle suspension (or 4LS)
Figure 5:
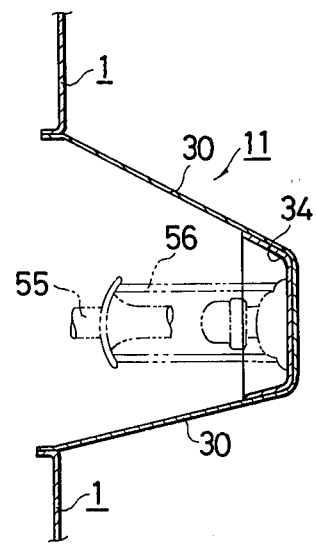
FIG. 5 is a similar view to that of FIG. 4 but taken along the section line V—V of FIG. 1.

Let us now turn to FIGS. 4 and 5 where the second mounting site is shown. This is in fact the mounting site for the shock absorber 55 and the associated coil spring 56 of either of the two preferred types of suspension. It will be noted at this point that it is possible to utilize other types of suspension but for the ease of explanation only two types will be described in this disclosure and they are namely the semi trailing arm rear independent suspension or S/T.IRs as it will be referred to from this point, and the four link trailing arm rigid axle suspension or 4LS as it will be referred to from this point. This second mounting site is formed in the uppermost portion of the wheel arch or housing 3 and is the same in both cases.

As best in FIG. 5 an inner panel 30 is connected to the floor panel 1 and shaped to form the roof of the tire housing 3. A rear parcel shelf 35 is arranged to pass in close proximity to the top of the tire housing. As shown this panel is formed with working holes 36 the function of which will be given later. A panel connector 33 connected at one edge thereof to the parcel shelf 35 passes back under the parcel shelf so that the other edge thereof juxtaposes the uppermost edge of the inner panel 30. A mounting member 34 is as shown bolted to, via bolts passing through bolt holes 37, the panel connector and the panel 30. The previously mentioned working holes are provided to facilitate the insertion and tightening of the securing nuts and bolts. An outer panel 32 is connected to the connector panel 33 thereby connecting same with the inner panel 30. The panel 32 is formed at its end portion with a curved section the end of which is fastened to a rear fender panel 31. To provide further rigidity a stiffening panel 39 is connected between the straight and curved portions of the outer panel 32. Connected to the connector panel 33 is a rear quarter inner panel 38, the end of which as can be seen in FIG. 4 juxtaposes that of the panel 32. The just described construction is preferable for ease of assembly but not essential to the invention it being possible to form a number of the above described panels integrally into one unit if desired.

Figure 6:
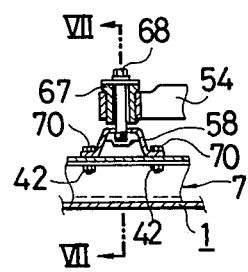
FIG. 6 is a perspective view of part of a mounting member used in connection with a semi trailing arm independent rear suspension, partially shown in section, according to the present invention.
Figure 7:
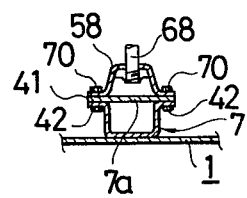
FIG. 7 is a sectional view taken along the line VII—VII of FIG. 6.

In FIGS. 6 and 7 details of the third mounting site are shown. These are generally denoted by the numeral 12 in FIG. 1. In practice this site is used for mounting the S/T.IRS type suspension. Thus in FIG. 6 we see a differential mounting member 54 (more clearly shown in FIGS. 9 and 10) which spans between the two support points 12 (only one is shown in FIG. 1). A supporting bracket 58 is as shown bolted to the differential supporting member 7 by nuts and bolts 42 and 70. The end of the differential mounting member is formed into a circular housing in which a rubber or other resilient material member is disposed. Passing through the middle of the resilient material member is bolt 68 which serves to fasten the differential mounting member 54 to the differential supporting member 7. The differential supporting member 7 has as shown a box type cross section and is fixedly connected to the floor panel 1.

Turning now to FIG. 8 there is shown a portion of the elongate support member 2. This section can be found located within the circle or area generally denoted by 13 in FIG. 1.

Denoted by 44a, 44b and 44c are holes and denoted by 46a, 46b, and 46c are nuts aligned with the holes and welded to the inner surface of the elongate rigid member 2. Holes 44e and 44d serve to locate a hollow cylindrical member 45, via the insertion of a bolt 83 through the holes and the centre of the cylindrical member. A nut 84 serves to lock the cylindrical member 45 in place, the latter two components are shown in FIG. 19.

The above serves as the fourth mounting site and in this disclosure is used only for the mounting of the 4LS. A further descripton of its use will be given in connection with FIGS. 14 and 15.

Figure 10:
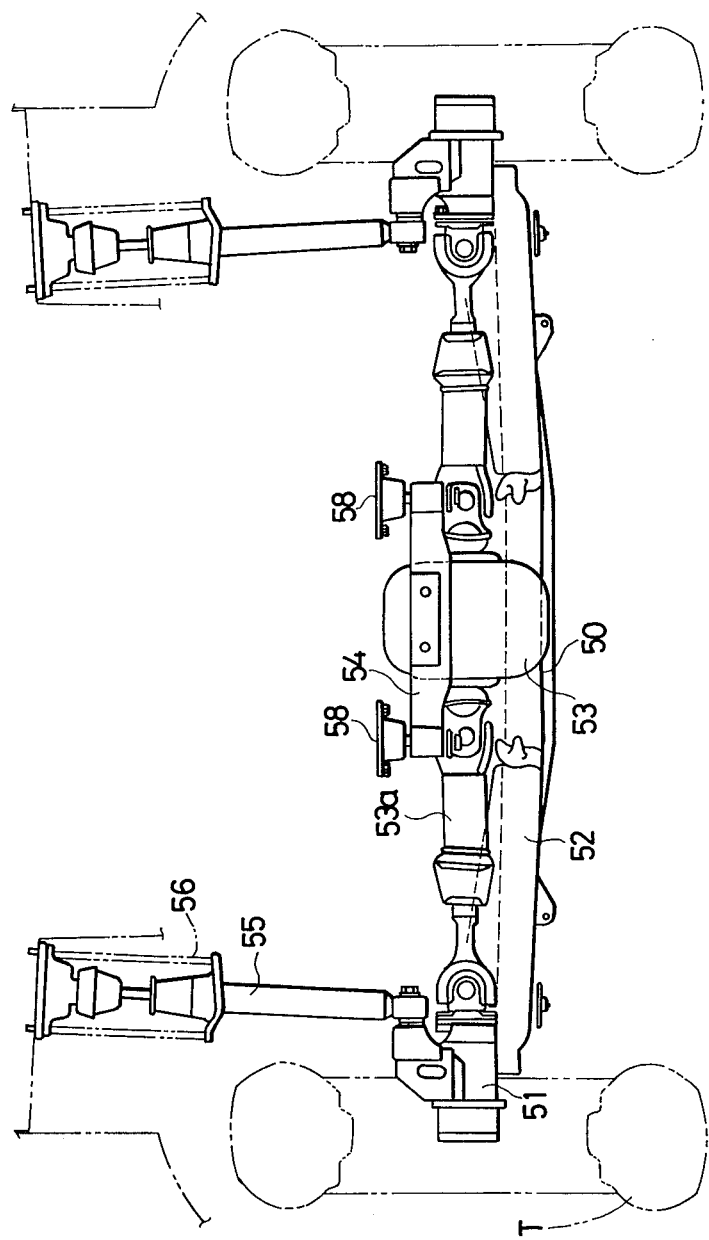
FIG. 10 is an elevational view of the suspension of FIG. 9 as seen from N of FIG. 9.

FIGS. 9 and 10 show one of the two preferred types of suspension adaptable to the vehicle construction according to this invention. The suspension is an S/T.IRS type having a trailing or suspension arm 52 pivotably connected to a suspension member 50 which traverses the rear of the vehicle. A rear axle 51 is rotatably supported at the end of the arm 52 and connected through a drive shaft 53a to the differential 53. Although the wheels are independently suspended it will be noted that they are designed to have a common axis of rotation (as in the case of a rigid axle suspension).

Denoted by the numerals 57, 55 and 58 are support brackets which respectively adapt the S/T.IRS to the vehicle body at the first, second and third support points respectively. The first support bracket used for adapting the S/T.IRS to the vehicle body is clearly shown in FIGS. 11 and 12. As can be seen the suspension member 50 is connected through a bolt 61 to the support bracket 57. Disposed between the suspension member 50 and the support bracket 57 is a cylindrical housing 59 having a shock absorbing rubber or resilient material member 60 disposed therein and arranged to surround the bolt. Further the bracket 57 is bolted to member 20 and/or the elongate member 2 via bolts 63 which are, as previously described engage the nuts 23 welded to the elongate member 2.

The second support site is shown in FIG. 13. This figure is essentially the same as FIG. 4 with the exception that one of the aforementioned panel construction variations is shown and a more detailed view of the support bracket 34 is included. As seen the assembly of the shock absorber and coil spring 55 and 56 is connected through an upper bracket 64 and the bracket 34 is bolted in place via bolts 65.

The third supporting site is denoted by the numeral 12 in FIG. 1, and so configured that, as clearly shown in FIGS. 9 and 10, the corresponding support bracket 58 is easily connectable thereto by bolts 69 which are inserted through holes 43 formed in the differential support member 7 (see FIG. 1).

FIGS. 14 and 15 show the second of the two preferred types of suspension adaptable to the vehicle body according to the present invention. This suspension is the 4LS type.

A live rigid axle (no numeral) extends to either rear wheel having mounted thereon a tire T from the differential 71 and is supported at points near its both extreme ends by upper and lower control arms 75 and 73 operatively connected to the vehicle body or chassis thereof. The upper control arm 75 is connected to the fourth mounting site via mounting or support bracket 74. The lower support arm is connected at the first mounting site through a mounting bracket 72 and the shock absorber assembly 55 and 56 is connected to the second mounting site as previously described.

Details of the mounting brackets for the 4LS are given in FIGS. 16 to 19. The first mounting site bracket for this type of suspension is quite different from that of the S/T.IRS type suspension. With this bracket the hole 21 does unused, the bracket 72 being bolted in place by bolts 79. This bracket serves to pivotably support the lower control arm 73 via a bolt or a suitable shaft 77 disposed through the bracket 72 and the control arm 73, as can be seen in FIG. 17.

The other mounting bracket 74 is bolted to the bent portion of the elongate rigid member 2 or fourth mounting site as clearly seen in FIGS. 15, 18 and 19 by a plurality of bolts 82 and bolt 83 passing horizontally and vertically through the elongate member 2. The upper control arm is connected to the bracket as best seen in FIG. 18 wherein as shown a bolt or other suitable shaft-like member 81 is disposed through a bore formed in the end thereof so act as an axle thereby permitting pivoting of movement same.

From the foregoing it will be appreciated that it is an extremely simple matter to fit at least two different types of suspension to the one vehicle body or chassis. As mentioned previously the invention is not limited to the two described suspension systems but may include other independent and rigid axle design rear suspensions.

It will be noted that all the mounting brackets are bolted in place facilitating easy fitting and removal when and if necessary. Furthermore in combination with the simple body construction, so formed to readily permit the fitting of the suspension thereto, the construction according to the invention presents unique advantages in that the factory producing motor vehicles of the types listed at the beginning of this disclosure is required to stock relatively few parts, the end result of which is an overall lower production cost which is permits the retail of the said vehicles at a lower price via the elimination of the unnecessary storage expenditure.

What is claimed is:

1. A motor vehicle body construction for supporting the rear suspension of the vehicle comprising:
    a floor panel so constructed and arranged to extend from the front of the passenger compartment to the rear end of the vehicle;
    a pair of elongate rigid members connected to the floor panel throughout at least a portion of their length, each being arranged to extend symmetrically with respect to the other from a first position, located near the side of the vehicle and forward of the common axis of rotation of the rear wheels, substantially parallel to the center line C of the vehicle to a second position between the rear end of the vehicle and the common axis or rotation of the rear wheels;
    a pair of rear wheel housings each so constructed and arranged to cover the rear wheels of the vehicle, and be located outboard of an elongate rigid member and not extend further than said first and second positions;
    a cross member connected symmetrically at its both ends to the pair of elongate rigid members and arranged to extend across the vehicle body rear of the common axis of rotation of the rear wheels;
    a first pair of suspension mounting sites each formed at the forward end of each elongate rigid member so as to be located forward of the common axis of the rear wheels;
    a second pair of suspension mounting sites each formed at the top of a wheel housing;
    a third pair of suspension mounting sites formed on the cross member so as to be located rear of the common axis of rotation of the rear wheels and close to the centre line C of the vehicle;
    a fourth pair of suspension mounting sites each formed on an elongate rigid member so as to be located between the first suspension mounting site and the common axis of rotation of the rear wheels; and
    bracket means connectable to the suspension mounting sites so that a plurality of different types of vehicle rear suspension may be interchangeably fitted to the vehicle.

2. A motor vehicle body construction as claimed in claim 1 wherein said bracket means comprises a plurality of brackets boltable to the vehicle body.

3. A motor vehicle body construction as claimed in claim 1 wherein said plurality of different types of vehicle rear suspension include at least one independent type rear suspension and at least one rigid axle type suspension.

4. A motor vehicle body construction as claimed in claim 3 wherein said at least one independent type near suspension is a semi trailing arm independent rear suspension.

5. A motor vehicle body construction as claimed in claim 3 wherein said at least one rigid axle suspension is a four link trailing arm rigid axle rear suspension.

6. A motor vehicle body construction as claimed in claim 4 wherein said semi trailing arm independent rear suspension is fitted to the vehicle body via said first, second and third mounting sites using first, second and third brackets respectively at each mounting site.

7. A motor vehicle body construction as claimed in claim 5 wherein said four link trailing arm rigid axle rear suspension is fitted to the vehicle body via said first, second and fourth supporting sites using fourth, second and fifth bracket means respectively at each mounting site.

* * * * *